(12) United States Patent
Miyauchi

(10) Patent No.: US 10,815,615 B2
(45) Date of Patent: Oct. 27, 2020

(54) CARPET TILE

(71) Applicant: JAPAN CARPET CO., LTD., Osaka (JP)

(72) Inventor: Nobuki Miyauchi, Osaka (JP)

(73) Assignee: JAPAN CARPET CO., LTD., Osaka (JP)

( * ) Notice: Subject to any disclaimer, the term of this patent is extended or adjusted under 35 U.S.C. 154(b) by 266 days.

(21) Appl. No.: 15/837,039

(22) Filed: Dec. 11, 2017

(65) Prior Publication Data
US 2018/0274169 A1 Sep. 27, 2018

(30) Foreign Application Priority Data
Mar. 27, 2017 (JP) .................................. 2017-061976

(51) Int. Cl.
*D06N 7/00* (2006.01)
*C09J 133/02* (2006.01)
(Continued)

(52) U.S. Cl.
CPC ........... *D06N 7/0076* (2013.01); *A47G 27/02* (2013.01); *B65B 5/06* (2013.01); *C09J 5/08* (2013.01); *C09J 7/38* (2018.01); *C09J 133/02* (2013.01); *C09J 175/04* (2013.01); *D06N 3/0043* (2013.01); *D06N 3/144* (2013.01);
(Continued)

(58) Field of Classification Search
CPC .. D06N 7/0063; D06N 7/0076; D06N 7/0071; C09J 7/38; C09J 5/08; C09J 2203/314
See application file for complete search history.

(56) References Cited

U.S. PATENT DOCUMENTS

| | | | |
|---|---|---|---|
| 2011/0008567 A1* | 1/2011 | Weeks | ..................... B32B 27/12 428/95 |
| 2014/0158276 A1* | 6/2014 | Higgins | ................. A47G 27/02 156/60 |

(Continued)

FOREIGN PATENT DOCUMENTS

| | | |
|---|---|---|
| CN | 104755572 A | 7/2015 |
| JP | H06-68205 B2 | 8/1994 |

(Continued)

OTHER PUBLICATIONS

Office Action issued in Chinese Patent Application No. 201711307582.8 dated May 8, 2020, with English Translation (14 pages).

*Primary Examiner* — Kelly M Gambetta
(74) *Attorney, Agent, or Firm* — Nakanishi IP Associates, LLC

(57) ABSTRACT

Mass production of carpet tiles can be enabled by a method for manufacturing a carpet tile by applying an adhesive layer to a carpet tile base material containing pile, the method including: a first process of mixing 15 to 25 wt. % of urethane resin glue to an acrylic foamed resin to produce 100 wt. % of a mixture, thereby obtaining an adhesive; a second process of subjecting the adhesive to viscosity adjustment to adjust viscosity thereof to 3000 to 6000 cps; and a third process of applying the adhesive to the carpet tile base material by using a screen mesh having a mesh thickness of 20 μm or more and less than 100 μm and an opening area ratio of 40% to 60%.

7 Claims, 1 Drawing Sheet

(51) Int. Cl.

| | |
|---|---|
| *C09J 5/08* | (2006.01) |
| *A47G 27/02* | (2006.01) |
| *B65B 5/06* | (2006.01) |
| *C09J 175/04* | (2006.01) |
| *D06N 3/00* | (2006.01) |
| *C09J 7/38* | (2018.01) |
| *D06N 3/14* | (2006.01) |

(52) U.S. Cl.
CPC ......... *D06N 7/0063* (2013.01); *D06N 7/0071* (2013.01); *D06N 7/0092* (2013.01); *C08G 2170/80* (2013.01); *C09J 2203/314* (2013.01); *C09J 2400/24* (2013.01); *C09J 2433/00* (2013.01); *C09J 2475/00* (2013.01); *D06N 2205/04* (2013.01); *D06N 2209/106* (2013.01)

(56) References Cited

U.S. PATENT DOCUMENTS

2015/0159324 A1\* 6/2015 Ikezaki ................ D06N 7/0086
428/97
2015/0282330 A1 10/2015 Iseda et al.

FOREIGN PATENT DOCUMENTS

| JP | 2013-118913 A | 6/2013 |
|---|---|---|
| JP | 2014-158663 A | 9/2014 |

\* cited by examiner

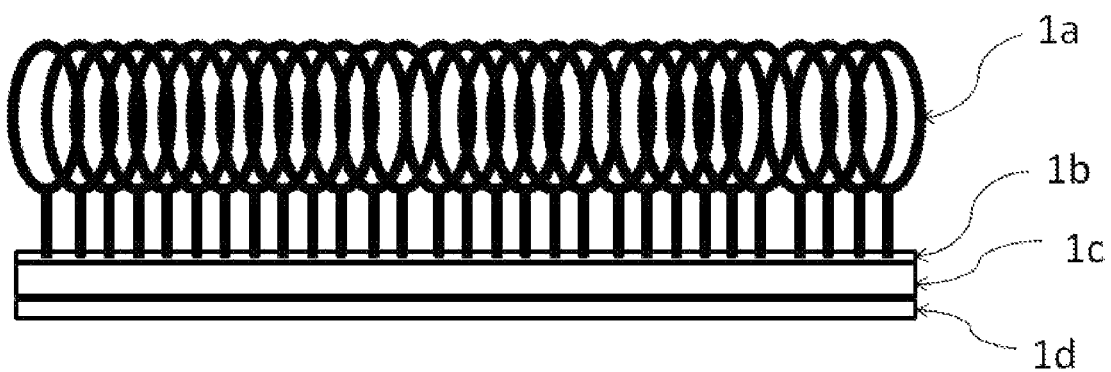

CARPET TILE

TECHNICAL FIELD

The present invention relates to a carpet tile, and in particular, the present invention relates to an adhesive for a carpet tile exhibiting optimal adhesion by being used in a carpet tile.

BACKGROUND ART

Carpet tiles are rectangular carpets. The greatest feature of carpet tiles is being capable of carpeting only a necessary area with carpet tiles, and in recent years, carpet tiles have been widely used mainly in offices. A normal carpet is required to have a size that fits in the size of a place to be carpeted, and a business model of build-to-order manufacturing is heavily used. However, in the case of the carpet tile, sites to be carpeted in various sizes can be carpeted with some carpet tiles that have the same size and are mass-produced, and this has an advantage in cost. Moreover, when a carpet tile is fouled, only this carpet tile can be replaced or washed. This point is also advantageous compared with conventional carpets.

For example, if a sufficient friction force is not generated between a carpet and a floor face at the time when someone walks on the carpet, carpet slips on the floor face, and thus, a risk where the person falls down is generated. The size of the carpet tile is one severalth of to several tenths of the size of a conventional carpet, and a friction force is thus difficult to be generated, and such risk is thus easily generated. The most reliable technique for preventing this risk can be said to be integrating the carpet tile and the floor face. Specifically, the floor face may be carpeted with carpet tiles by applying glue to the floor face and thereafter carpeting the floor face with carpet tiles.

As carpet tiles become widely available, buildings mainly for use as offices based on using carpet tiles come into use. Specifically, for example, there is a floor having a two-layer structure (generally called as a double floor or a free-access floor) that easily achieves Internet access by wiring in a space provided between the floors. The surface of this floor is uniform, and a sufficient friction force thus can be generated between carpet tiles and the floor by using an adhesive having a low adhesive force without bonding with glue, and anti-slip property can be exhibited on the carpet tile.

Glue is not used on the floor, and any special technique nor chemical agent is not required to remove glue, and carpet tiles can be easily removed. Thus, an advantageous effect of being capable of readily replacing only a carpet tile that is fouled can be maximally exhibited.

In recent years, a commercial product of a carpet tile that is sold in the state where an adhesive has been applied to the back of the carpet tile in advance has been distributed. In the case of using this type of carpet tile, the process of applying the adhesive to the base to be carpeted is abbreviated, and the base to be carpeted is merely carpeted with the carpet tile. Thus, an advance knowledge and skills are not required in carpeting. Therefore, the carpet tile comes into use as a household carpet tile with which a flooring and a corridor are easily carpeted.

However, general adhesives cannot exhibit sufficient anti-slip property on all of the floorings. For example, carpet tiles do not adhere to a base to be carpeted in the environment containing dust and sand. Thus, a large friction force is not generated.

In order to exhibit sufficient anti-slip property in such an environment, an adhesive that generates a larger friction force may be used. However, when an adhesive force is merely increased, the back of the carpet tile adheres to a floor face, and the condition is the same as the case using glue.

Generally, 16 to 20 carpet tiles are packed in a box and are shipped and sold. When an adhesive force is increased, carpet tiles conglutinate with each other, and it is assumed to be difficult to release carpet tiles at the time of taking carpet tiles out from the box and in carpeting.

It is thus required not to generate much adhesive force in the direction perpendicular to the floor face and generate a strong adhesive force in the direction parallel with the floor face. In order to solve this problem, technologies have been developed, and as shown in PTL 1, as an adhesive that exhibits sufficient anti-slip property on various floor faces, a technology in which an adhesive is obtained by mixing a urethan resin glue with an acrylic foamed resin, and the proportion of the urethane resin to be added is 10 to 30 wt. % was developed.

CITATION LIST

Patent Literature

Japanese Patent Application Publication No. 2014-158663

SUMMARY OF THE INVENTION

In the composition described in PTL 1, the adhesion in the direction parallel with the floor face and the adhesion in the direction perpendicular direction to the floor face are sufficiently achieved. However, automation of a process of applying, required for commercialization, i.e., large-scale production cannot be achieved. Furthermore, at about the upper limit and about the lower limit of the proportion of the urethane resin to be added, some floor faces could not exhibit sufficient performance.

As a method for applying an adhesive to the back of a carpet tile, there is a method in which a screen mesh in a shape of a pattern for applying an adhesive is caused to be close to the back of a carpet tile, the adhesive is then applied from the top of the screen mesh to apply the adhesive from openings of the screen mesh. However, when the adhesive having the composition described in PLT 1 is used in this process, the adhesive is partially solidified, many lumps are generated, and the adhesive cannot smoothly pass through the screen mesh in many cases.

When the screen mesh is released from the carpet tile after the completion of applying the adhesive, the amount of the adhesive leaked from the screen mesh side toward to carpet tile side is required not to be higher than expected. However, when a property of allowing the adhesive to pass through the screen mesh is bad, the adhesive adheres to the screen mesh surface side, the adhesive remains in an unintended line on the carpet tile, and a print pattern is fouled in many cases.

A plurality of carpet tiles are packed in a box such as cardboard and are shipped. At that time, the carpet tiles are packed in a box in the state where backs of the respective carpet tiles are faced to each other in many cases. This is employed to completely eliminate a risk where the adhesive on the back, which may be generated in the case where the back of a carpet tile and the surface of a carpet tiles are directly in contact with each other conglutinates with pile on the surface.

However, it is required to appropriately select a lattice pattern as a pattern for applying an adhesive to have alternating relationship when the backs of carpet tiles are faced to each other so that adhesives do not conglutinate with each other, and it is also required to have production facilities for flipping carpet tiles over and facing backs of the respective carpet tiles to each other when packing the carpet tiles in a box. It costs a lot.

Solution to Problem

Hence, the present invention is intended to provide, by a method for manufacturing a carpet tile by applying an adhesive layer to a carpet tile base material containing pile, the method including:

a first process of mixing 15 to 25 wt. % of urethane resin glue to an acrylic foamed resin to produce 100 wt. % of a mixture, thereby obtaining an adhesive;

a second process of subjecting the adhesive to viscosity adjustment to adjust viscosity thereof to 3000 to 6000 cps; and a third process of applying the adhesive to the carpet tile base material by using a screen mesh having a mesh thickness of 20 μM or more and less than 100 μm and an opening area ratio of 40 to 60%, an adhesive that can hold a carpet tile on any floor face, and a method for manufacturing carpet tiles with the use of the adhesive on the basis of mass-production.

Advantageous Effects of Invention

With the use of the adhesive of the present invention, the kind of the base to be carpeted that is limited when conventional adhesives are used is not limited because of the strong adhesive force, and sufficient anti-slip property can be obtained regardless of the kind of the floor face base to be used. Furthermore, by optimizing the process of drying, the productivity of the process of applying is largely increased, and the yield in large-scale production can be drastically improved (generation of errors in applying can be largely decreased).

Moreover, a strong adhesive force is generated in the direction parallel with the base, and an adhesive force is barely generated in the direction perpendicular to the base. Thus, even when pile on the surface of the carpet tile and the adhesive applied to the back are directly in contact with each other, a risk where the adhesive conglutinates with the pile on the surface is not generated. Thus, in a method for packing carpet tiles, carpet tiles can be packed, the back of the pile on all of carpet tiles facing downward and the surface of the pile on all of carpet tiles facing upward, and cost in packing can be reduced.

It is also not required to select an appropriate pattern for applying the adhesive so that adhesives are not directly in contact with each other when the backs are in contact with each other. Thus, the pattern for applying the adhesive can be freely selected, and flexibility of selecting an application design is drastically increased.

Furthermore, coating characteristics of the adhesive in product shipping are largely changed from those of the adhesive in applying by introducing a strictly controlled process of drying after the process of applying the adhesive, and an adhesive that can sufficiently exhibit anti-slip property on various floor faces at the time of product shipping and thus have really specific and excellent coating characteristics was developed.

BRIEF DESCRIPTION OF THE DRAWINGS

FIG. 1 is a drawing showing a carpet tile of the present invention.

DETAILED DESCRIPTION OF EMBODIMENTS

The following describes an embodiment of the present invention with reference to an attached drawing.

FIG. 1 is a drawing showing a carpet tile of the present invention. The carpet tile of the present invention is mainly composed of pile 1a, a base fabric 1b, a base material 1c, and an adhesive layer 1d, and is manufactured by integrating the base fabric 1b with the pile 1a and a base material 1c and thereafter applying an adhesive 1e to a face of the base material 1c on which the pile is not present to configure an adhesive layer 1d. The carpet tile of the present invention, however is the same as known carpet tile other than the configuration of the adhesive layer 1d.

The present invention is described below using polypropylene as the pile 1a, any nonwoven fabric or woven fabric as the base fabric, and polyvinyl chloride as the base material 1c. Another material, for example, spun dyed nylon may be used as the pile 1a.

Furthermore, the configuration can be changed by, for example, arranging glass nonwoven fabric inside the base material 1c and further arranging a felt layer and a polyvinyl chloride layer between the base material 1c and the adhesive layer 1d. All of the materials that can be used in known carpet tiles can be employed, and the features of the present invention lie in the material and amount of the adhesive, and the mass-production method for manufacturing carpet tiles with the use of the adhesive.

The adhesive 1e used in the adhesive layer 1d of the present invention can be used in carpet tiles in all sizes. However, the amount of the adhesive 1e to be used changes according to the sizes. Therefore, the present invention is described assuming that the carpet tile has a size of 500 mm×500 mm square, unless otherwise noted.

As the adhesive 1e, a mixture obtained by mixing 80 wt. % of the acrylic foamed resin 2 and 20 wt. % of the urethane resin glue 3 was employed. As the acrylic foamed resin 2, an acrylic copolymer aqueous emulsion obtained by dispersing fine particles of acrylic resin in water is preferable. The foaming ratio of the acrylic foamed resin 2 is preferably in the range of 1.5 times or more and less than 2.0 times. As the urethane resin glue 3, a mixture obtained by mixing a surfactant or N-methyl-2-pyrrolidone in aliphatic polyester urethane and water is preferable.

At the above-mentioned ratio between the acrylic foamed resin 2 and the urethane resin glue 3, the balance between anti-slip property and peeling property is the highest. However, it has been turned out that the performance degradation is minimum when the variation is about 5 wt. %. That is, the amount of the acrylic foamed resin 2 is allowed to be from 75 wt. % to 85 wt. %, and the amount of the urethane resin glue 3 is allowed to be from 25 wt. % to 15 wt. %. The expression means that the amount of the urethane resin glue 3 is 25 wt. %, when the amount of the acrylic foamed resin 2 is 75 wt. %, and the amount of the urethane resin glue 3 is 15 wt. % when the amount of the acrylic foamed resin 2 is 85 wt. %.

It has also been turned out that when the amount of the acrylic foamed resin 2 and the amount of the urethane resin glue 3 exceed these values, for example, the amount of the acrylic foamed resin 2 is 70 wt. %, and the amount of the urethane resin glue 3 is 30 wt. %, sufficient anti-slip property can be exhibited on most of bases, and however, variations in drying conditions and the like lead to dirt on the pile surface. That is, when the amount of the acrylic foamed resin 2 is 69 wt. % or less, and the amount of the urethane resin glue 3 exceeds 31 wt. %, properties of the adhesive change from adhesive-like properties to glue-like properties, a carpet tile strongly adheres to a base in carpeting, and the ease of replacement of the carpet tile, which is a feature of the carpet tile is affected. This is thus unfavorable.

A viscosity reducer (catalyst) 4 is added in addition to the acrylic foamed resin 2 and the urethane resin glue 3. The viscosity reducer (catalyst) 4 is preferably an inorganic salt-based catalyst aqueous solution and preferably contains about 10% to about 20% of ammonium nitrate. The viscosity of the adhesive layer 1d after being shipped as a carpet tile 1 can be adjusted to be optimal when the viscosity reducer (catalyst) 4 is added, and spreading out the adhesive 1e on the entire screen mesh and certainly applying the appropriate amount of the adhesive 1e can be easily performed when the viscosity of the entire adhesive 1e in manufacturing is reduced.

The amount of the viscosity reducer (catalyst) 4 to be added is preferably 10 wt. %. The total weight of the acrylic foamed resin 2 and the urethane resin glue 3 is defined to be 100 wt. % (generally referred to as PHR), and based on this, the percentage by weight of the additive is calculated. Thus, the total amount of the acrylic foamed resin 2, the urethane resin glue 3, and the additive exceeds 100 wt. %.

To finely adjust the viscosity of the adhesive 1e, 0.1 wt. % of the thickener 5 is added. The thickener 5 is preferably a mixture of a nonionic surfactant, water and the like. The viscosity is adjusted to be in the range from 3000 to 6000 cps, and an ideal viscosity is 4500 cps. It is more preferred that the viscosity is adjusted to be close to the ideal viscosity.

Necessary components of the adhesive 1e are an acrylic foamed resin 2 and a urethane resin glue 3. However, when the viscosity of the adhesive 1e is adjusted to be in the range from 3000 to 6000 cps by the combination of the viscosity reducer (catalyst) 4 and the thickener 5, and, in particular, when the viscosity is adjusted to the vicinity of an ideal value—4500 cps, the composition of the adhesive 1e may not be the same as described above. That is, when the viscosity is in this range without the thickener 5, the thickener 5 may not be used.

The adhesive 1e added as mentioned above is applied to a carpet tile using a screen mesh. Various patterns (for example, Japanese Patent Application Laid-open No. 2013-118913, Japanese Examined Patent Publication No. H06-68205) have conventionally been developed for applying an adhesive. Any pattern can be employed as a pattern for applying the adhesive 1e of the present invention.

Carpet tiles are shipped in the state where a plurality of carpet tiles are put in a box. At that time, generally, backs face to each other to reduce a risk of adhesion of the adhesive to the pile. When adhesives are directly in contact with each other in this state, adhesives conglutinate with each other and are difficult to be released from each other in sites to be carpeted in some cases. In order to prevent this, there is a method for inserting release paper, for example. However, a larger amount of release paper waste is generated in the sites to be carpeted.

In order to solve this problem, a lattice pattern (checkered pattern) is used as the pattern for applying an adhesive so that adhesives are not directly in contact with each other when backs of the respective carpet tiles face to each other. That is, a pattern of alternating relationship is employed.

The adhesive 1e of the present invention has a feature of having really favorable anti-slip performance in the parallel direction and barely exhibiting adhesion in the perpendicular direction. Thus, the adhesive 1e does not at all adhere to the pile 1a when carpet tiles are put in one direction, and the adhesive layer 1d and the pile 1a are directly in contact with each other.

Thus, in shipping of carpet tiles, involving a cost, it is not required to employ a technique of facing backs to each other, carpet tiles are put in a box in sequence, with the surface of the carpet tile 1 on the pile 1a side facing downward and the back of the carpet tile 1 on the adhesive 1e side facing upward, and a sheet of release paper is put on the adhesive layer 1d of the last carpet tile (the carpet tile packed on the top), to eliminate the possibility of conglutinating the pressure-sensitive adhesive layer 1d and the box. As the release paper, single-sided cardboard (or one side cardboard) is optimal.

When carpet tiles are packed using this technique, the adhesive 1e and the pile 1a do not conglutinate with each other even in the case where the weight is loaded on the carpet tiles by, for example, stacking, after shipping, boxes in which the carpet tiles are packed. Thus, there is no ban on stacking.

In contrast, when backs face to each other, and adhesives 1e are directly in contact with each other, the adhesives 1e conglutinate with each other without selecting appropriate pattern for applying the adhesives 1e. This is not preferable. The adhesive 1e of the present invention exhibits really strong adhesive force. Thus, when an adhesive 1e of a carpet tile and a base material 1c of another carpet tile are directly in contact with each other, the adhesive 1e may conglutinate with the base material 1c. Also from this viewpoint, carpet tiles are desired to be packed not by a conventional method for packing carpet tiles using the technique of causing backs to be in contact with each other, but by the above-mentioned method.

In the method for packing carpet tiles of the present invention, backs do not face to each other. It is thus not required to select appropriate pattern for applying so that adhesives 1e are not directly in contact with each other. Thus, any pattern for applying the adhesive can be freely selected among various designs, and it is also not required to differently use a plurality of patterns so that carpet tiles face complementary, and it is only required to control the amount of the adhesive 1e to be applied using only one pattern.

In the method for applying the adhesive, in the state where a screen mesh weaved using polyester yarns that has a thickness from 20 to 100 μm is pressed against the carpet tile 1, the adhesive is spread on the screen mesh using a squeegee rubber. By employing this thickness, an excessively large mass of the adhesive 1e is not generated, and a risk where the adhesive 1e is not sufficiently applied to carpet tiles because an excessively small mass of the adhesive 1e lacks weigh to cause the adhesive 1e to stick to the screen mesh is eliminated.

The design (pattern for applying) of the screen mesh may be any design. It is however preferred that the number of meshes (the number of warp yarns and weft yarns in one square inch) is about 25 to about 60 meshes, and the opening are ratio (the proportion of the openings in the screen mesh) is 40% to 60%.

The rubber hardness of the squeegee rubber is preferably 50 to 80. The squeegee angle that is an angle at which the squeegee rubber is caused to be in contact with the screen mesh is preferably 45° to 60°.

By pressing the adhesive 1e from the top of the screen mesh using the squeegee rubber, the adhesive 1e is applied to the back of the carpet tile 1 via openings of the screen mesh. The larger the amount of the adhesive 1e to be applied is, the higher the anti-slip performance is. However, the cost of the adhesive 1e is increased. Thus, the amount is preferably less than 40 to 80 g/m² per 1 m² of the carpet tile. With the amount of the adhesive to be applied of less than 40 to 60 g/m², sufficient anti-slip performance can be obtained except for the concretes that highly require anti-slip performance.

Thereafter, drying is performed, and it has been turned out that the physical properties of the adhesive change according to the method of this drying. In the method of the drying by which an optimal viscosity can be obtained, obtained as results of earnest studies by the inventors of the present inventions, the drying temperature is from 120° C. to 150° C., and the drying time is from 4 to 6 minutes. By employing this method of drying, a risk where a coat is formed in the state where the surface of the adhesive 1e is dried quickly, and the process of the drying is finished in the state where moisture inside the adhesive protected with the coat is not sufficiently volatilized (a kind of half dry state) is eliminated, and the performance of the adhesive layer 1d can be stabilized.

After finishing the process of the drying, the carpet tile may be packed for shipping by the above-mentioned method.

In the carpet tile of the present invention, manufactured by the method as described above, the acrylic foamed resin 2 is formed as the material of the adhesive 1e. Thus, the adhesive layer 1d itself has cushioning properties. Therefore, shock absorption properties of the entire carpet tile can be increased.

The adhesion (the extent of stickiness) obtained by mixing urethane resin glue to an acrylic resin is optimal, and a change in adhesion not only in first use but also in repeated use is really small. The adhesion in the parallel direction (tensile strength) is strong, and however, the adhesion in the perpendicular direction (release strength) is weak as compared with the adhesion in the parallel direction. Thus, when the carpet tiles are stored, backs of the respective carpet tiles are not required to be adhered to each other. Even when the pile is caused to be in contact with the adhesive layer, a risk where the adhesive conglutinates with the pile is eliminated.

With the really strong adhesion in the parallel direction, a carpet tile that exhibits anti-slip performance that is practically sufficient in an environment of much dust and sand in which conventional carpet tiles are inapplicable is achieved. Even when the adhesive layer 1d is washed with water, the adhesive layer 1d is hardly deteriorated, and even when the adhesive layer 1d is used in a carpet tile that is made washable, the washable properties can be maintained.

In the laboratory, the above-mentioned performance could have been exhibited. However, the completed present invention makes it possible to stably manufacture the carpet tiles in large-scale production lines and to provide an adhesive 1e that can stably exhibit anti-slip property on various bases and a carpet tile using the adhesive 1e in the market.

EXAMPLE

The following describes the present invention in further detail with reference to an example.

As an acrylic foamed resin, 80 weight (g) of Crosslen CLF-1 manufactured by Aica Kogyo Co., Ltd. was used, and as a urethane resin, 20 weight (g) of Sunplex PUE-160D manufactured by Murayama Chemical Laboratory Co., Ltd. was used. In addition, as an additive, 10 weight (g) of a catalyst #3000 manufactured by Matsui Shikiso Chemical Co., Ltd., which is a viscosity reducer was used, and 0.1 weight (g) of Nopal 700N manufactured by San Nopco Limited, which is a thickener was used. PUE-160D has a foaming ratio of 1.5 to 2.0 times. In this case, the viscosity was 4500 cps.

When the composition of these materials is calculated to be 100% as a whole (in the case where the percentage by weight is used, the PHR unit in which the total weight of the acrylic foamed resin and the urethane resin that are main agents is 100), the percentage of Crosslen CLF-1 is 72.6612%, the percentage of Sunplex PUE-160D is 18.1653%, the percentage of catalyst #3000 is 9.08265%, and the percentage of Nopal 700N is 0.09083%.

The adhesive 1e obtained by mixing these materials was applied to a carpet tile by causing a squeegee rubber having a rubber hardness of 60 to be in contact with a screen mesh having a mesh thickness of 50 μm, the number of meshes of 25, and an opening area ratio of 40% at an angle from 45° to 55°. The amount of the adhesive 1e to be applied is 12 to 16 g/m² per one carpet tile. After applying the adhesive 1e, the carpet tile was dried at a drying temperature of 140° C. for 6 minutes.

Anti-slip performance was exhibited without any displacement even when the carpet tile thus obtained was arranged under the environment of much dust and sand, and a force was applied in the parallel direction in the state where feet of an 82.5-kg male are pressed to the carpet tile. Furthermore, the carpet tile could be really easily released.

The embodiment of the present invention is described above. Apart or whole of the embodiment of the present invention can be described as the following Supplementary Notes.

Supplementary Note 1

A method for manufacturing a carpet tile by applying an adhesive layer to a carpet tile base material containing pile, the method including:

a first process of mixing 15 to 25 wt. % of urethane resin glue to an acrylic foamed resin to produce 100 wt. % of a mixture, thereby obtaining an adhesive;

a second process of subjecting the adhesive to viscosity adjustment to adjust viscosity thereof to 3000 to 6000 cps; and a third process of applying the adhesive to the carpet tile base material by using a screen mesh having a mesh thickness of 20 μM or more and less than 100 μm and an opening area ratio of 40% to 60%.

Supplementary Note 2

The method for manufacturing a carpet tile according to Supplementary Note 1, wherein in the third process, a squeegee rubber having a rubber hardness of 50 or more and less than 80 is caused to be in contact with the screen mesh at an angle of 45° to 55° thereby applying the adhesive to the carpet tile base material.

Supplementary Note 3

The method for manufacturing a carpet tile according to Supplementary Note 1 or 2, further comprising:

a fourth process of drying, after the third process, the carpet tile base material at a drying temperature of 120° C. or more and less than 150° C. for 4 minutes or more and less than 8 minutes thereby drying the adhesive applied to the carpet tile.

Supplementary Note 4

The method for manufacturing a carpet tile according to Supplementary Note 3, further comprising:

a fifth process of packing, after the fourth process, a predetermined number of carpet tiles in a state, where the pile faces downward and the adhesive faces upward, into a box and putting a sheet of release paper on the last carpet tile after packing the last carpet tile in the box.

Supplementary Note 5

The method according for manufacturing a carpet tile to any one of Supplementary Notes 1 to 4, wherein a foaming ratio of the acrylic foamed resin is 1.5 times or more and less than 2.0 times.

Supplementary Note 6

The method for manufacturing a carpet tile according to any one of Supplementary Notes 1 to 5, wherein an amount of the adhesive to be applied in the third process is 40 to 80 g/m$^2$ per 1 m$^2$ of the carpet tile.

Supplementary Note 7

A carpet tile comprising an adhesive applied thereon, the adhesive having a viscosity of 3000 cps or more to 6000 cps or less, and produced by mixing 15 to 25 wt. % of urethane resin glue with an acrylic foamed resin to produce 100 wt. % of a mixture.

REFERENCE SIGNS LIST

1 Carpet tile of the present invention
1*a* Pile
1*b* Base fabric
1*c* Base material
1*d* Adhesive layer
1*e* Adhesive of the present invention
2 Acrylic foamed resin
3 Urethane resin glue
4 Viscosity reducer (catalyst)
5 Thickener

What is claimed is:

1. A method for manufacturing a carpet tile by applying an adhesive layer to a carpet tile base material containing pile,
wherein the carpet tile base material includes a base material integrated with a base fabric and a pile driven into the base fabric, and the method comprises:
a first process of mixing 15 to 25 wt. % of urethane resin glue to an acrylic foamed resin to produce 100 wt. % of a mixture, thereby obtaining an adhesive;
a second process of adding a viscosity reducer to the adhesive at a ratio of 10 to 20 wt. % of the viscosity reducer to 100 wt. % of the mixture, thereby subjecting the adhesive to viscosity adjustment to adjust viscosity thereof to 3000 to 6000 cps; and
a third process of applying the adhesive as an outermost surface layer of the carpet tile, to a surface of the base material facing away from a surface of the base fabric into which the pile is driven, by using a screen mesh having a mesh thickness of 20 μm or more and less than 100 μm and an opening area ratio of 40 to 60%.

2. The method for manufacturing a carpet tile according to claim 1, wherein in the third process, a squeegee rubber having a rubber hardness of 50 or more and less than 80 is caused to be in contact with said screen mesh at an angle of 45° to 55° thereby applying the adhesive to the carpet tile base material.

3. The method for manufacturing a carpet tile according to claim 1, further comprising:
a fourth process of drying, after the third process, the carpet tile base material at a drying temperature of 120° C. or more and less than 150° C. for 4 minutes or more and less than 8 minutes thereby drying the adhesive applied to the carpet tile.

4. The method for manufacturing a carpet tile according to claim 3, further comprising:
a fifth process of packing, after the fourth process, a predetermined number of carpet tiles in a state, where the pile faces downward and the adhesive layer faces upward, into a box and putting a sheet of release paper on the last carpet tile after packing the last carpet tile in the box.

5. The method for manufacturing a carpet tile according to claim 1, wherein a foaming ratio of the acrylic foamed resin is 1.5 times or more and less than 2.0 times.

6. The method for manufacturing a carpet tile according to claim 1, wherein an amount of the adhesive to be applied in the third process is 40 to 80 g/m$^2$ per 1 m$^2$ of the carpet tile.

7. The method for manufacturing a carpet tile according to claim 1, wherein the second process further comprises: adding a thickener to the adhesive at a ratio of 0.1 wt. % of the thickener to 100 wt. % of the mixture.

* * * * *